BEST AVAILABLE COPY (No Model.)

F. E. HALL.
DRIVING REIN GUARD.

No. 537,975.  Patented Apr. 23, 1895.

WITNESSES.
E. H. Gilman
Geo. A. Holmes

INVENTOR
Frank E. Hall
by M. B. H. Dows
atty.

UNITED STATES PATENT OFFICE.

FRANK E. HALL, OF NEWTON, MASSACHUSETTS.

DRIVING-REIN GUARD.

SPECIFICATION forming part of Letters Patent No. 537,975, dated April 23, 1895.

Application filed May 7, 1894. Serial No. 510,420. (No model.)

*To all whom it may concern:*

Be it known that I, FRANK E. HALL, a citizen of the United States, residing at Newton, in the county of Middlesex and Commonwealth of Massachusetts, have invented an Improvement in Driving-Rein Guards, of which the following is a full specification.

My invention relates to an improved safety device to be applied to a vehicle in order to prevent the driving reins from becoming caught under the ends of the shafts, and consists of an arrangement whereby the ends of the shafts are connected, hereinafter described in detail.

Figure 1:
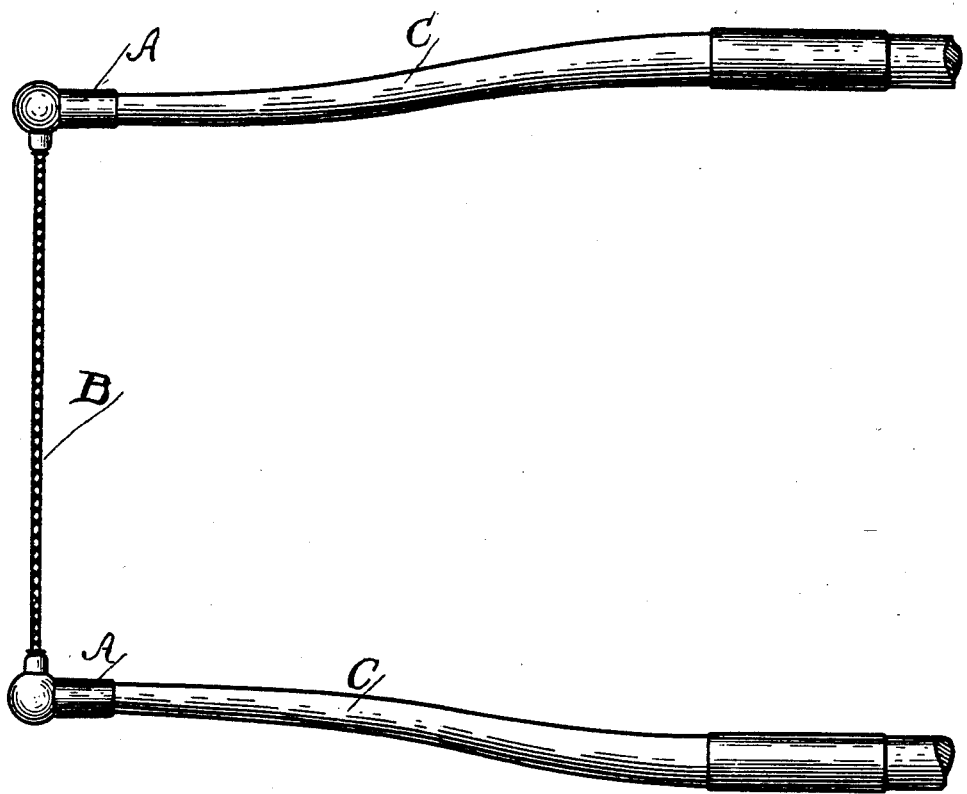
Figure 2:
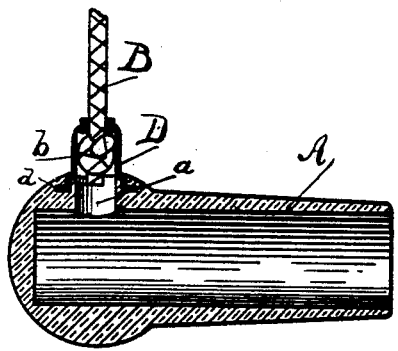
Figure 3:
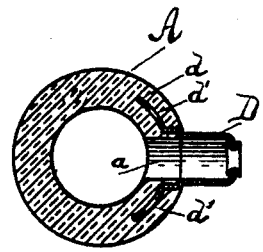

Referring to the accompanying drawings, Figure 1 is a plan of the ends of the shafts of a vehicle having my improved rein guard attached to the ends thereof. Fig. 2 is a longitudinal section through one of the tips. Fig. 3 is a cross section of the same through center line of hole for connecting cord.

My rein guard, as shown in the drawings, preferably consists of two movable tips A A, connected by an elastic cord B. The tips are preferably made of elastic rubber of the shape shown, so that when forced on to the ends of the shafts C C, they will adhere firmly thereto. Near the outer end of the tip is a hole $a$ through which passes the connecting cord, which is knotted, ($b$), on the inner side to prevent its being pulled through.

In the drawings I have shown the hole $a$ as reinforced by the flanged metallic eyelet D, which is cast into the tip. The flange $d$ is made large enough to extend into the rubber a considerable distance, and is provided with holes $d'$ which become filled with rubber in casting and tend to hold the eyelet more strongly in place. While this eyelet, which is preferably nickel plated, adds to the appearance of the tip, it is obvious that it may be dispensed with, without altering the efficiency of the rein guard, in which case the cord would simply be passed through the hole in the rubber and knotted on the inside.

A great many accidents have been caused by the reins becoming caught under the inside of the ends of the shafts, and with my improved guard it is impossible for this to occur. While I have shown an elastic connecting cord with flexible externally fitting tips, it is evident that the same result will be obtained by using a non-elastic connecting cord, or chain, or any kind of movable tips for the shafts.

I claim—

A driving rein guard consisting of removable elastic shaft tips provided with sockets and with holes through the sides thereof containing tubular sockets with contracted mouths, said tips being connected to each other by a cord with enlargements on its end and secured in said tubular sockets substantially as described.

In witness whereof I have hereunto set my hand.

FRANK E. HALL.

Witnesses:
WM. B. H. DOWSE,
E. H. GILMAN.